United States Patent [19]
Strunk et al.

[11] 3,978,795
[45] Sept. 7, 1976

[54] RETAINING RING APPARATUS

[75] Inventors: Manfred Strunk, Neuenrade; Heinz Kroschel, Troisdorf-Sieglar; Alfred Voss, Cologne, all of Germany

[73] Assignee: Dynamit Nobel Aktiengesellschaft, Germany

[22] Filed: Sept. 16, 1974

[21] Appl. No.: 506,338

Related U.S. Application Data

[62] Division of Ser. No. 376,278, July 5, 1973, abandoned.

[30] Foreign Application Priority Data

July 5, 1972   Germany............................ 2232955

[52] U.S. Cl............................................. 102/56 SC
[51] Int. Cl.² .......................................... F42B 13/10
[58] Field of Search .................... 102/24 HC, 56 SC; 151/35

[56] References Cited
UNITED STATES PATENTS

| | | | |
|---|---|---|---|
| 1,267,695 | 5/1918 | Rich, Jr. | 151/35 |
| 1,323,188 | 11/1919 | Humphris | 151/35 |
| 2,419,414 | 4/1947 | Mahaupt | 102/56 SC |

*Primary Examiner*—Verlin R. Pendegrass
*Attorney, Agent, or Firm*—Craig & Antonelli

[57] ABSTRACT

A retaining ring which may be utilized in hollow charge projectiles having a ring-shaped member and resilient tongues bent out of the plane of the ring member and having one end joined to the ring member. The resilient tongues extend approximately in the peripheral direction of the ring member and successive tongues are bent toward different sides of the ring member.

7 Claims, 4 Drawing Figures

RETAINING RING APPARATUS

This is a division of application Ser. No. 376,278 filed July 5, 1973, and now abandoned.

The present invention relates to a safety or retaining ring, which ring may be utilized in hollow charge projectiles.

Retaining rings are employed for the mutual fixation of two or more individual components. These rings are known in numerous designs in correspondence with the various applications and usages. Thus, for example, toothed disks with twisted teeth, or corrugated spring plates or washers are utilized if the space available for the retaining ring has a radial height which is small as compared to the diameter. However, for many utilization purposes, the radial height of these conventional retaining rings is still too large. Such a use is, for example, present in a hollow-charge projectile wherein the preferably funnel-shaped metallic lining is fixed by means of a retaining ring. In this structure, the receiving groove for receiving the retaining ring not only has a very small radial extent, but also is subject to relatively large manufacturing fluctuations in its axial width, so that the retaining ring must have correspondingly large deflection tolerances. Also in this respect, the conventional toothed disks or corrugated spring rings are unsatisfactory. In the latter, there is the additional disadvantage that the spring ring is enlarged in its outer diameter when it is axially compressed. Although this can be overcome conventionally by radially severing the ring at one point, there is the danger, due to the very minor radial extent or height of the receiving groove, that the ring is partially forced out of the groove when axially compressed, so that the desired fixation of the individual components is no longer safely ensured.

It is therefore an object of the present invention to provide a retaining ring which overcomes the disadvantages of conventional retaining rings.

It is another object of the present invention to construct a retaining ring so that it has, on the one hand, a very minor radial height as compared to the diameter and, on the other hand, permits the bridging of relatively large axial tolerances.

In accordance with the invention, there is provided a retaining ring having resilient tongues, which are joined with one end to a ring, are bent out of the plane thereof, and extend at least approximately in the peripheral direction of the ring. The length of the tongues can be selected advantageously independently of the radial height or extent of the safety ring in accordance with the respective requirements, i.e. corresponding to the tolerances to be compensated for. By controlling the manner in which the tongues are bent, it is possible to attain in each case the optimum spring characteristic.

According to a feature of the present invention, the resilient tongues can basically be constructed as separate, strip-shaped elements joined at one end to the retaining ring, for example by gluing or spot welding. However, in accordance with an embodiment of the invention, the tongues are formed by means of a radial cut and a subsequent cut extending in the peripheral direction, and by bending the tongues about a radial axis. This makes it possible to construct the retaining ring and tongues as an integral component, wherein the tongues have a constant width over their length. Of course, one-piece structures are also possible wherein the tongues are produced by means of differently oriented cuts or notches and have, for example, a width decreasing toward the free end, so that the respective requirements can be met in each individual case, in an advantageous manner.

According to a further feature of this invention, with a view toward obtaining a maximally large axial spring pitch, successive tongues are bent toward different sides of the ring. If the retaining ring is to be employed as a threaded locking means, in accordance with another feature of this invention the tongues are arranged in pairs mutually facing each other with their ends joined to the retaining ring.

A particularly advantageous utilization of the retaining ring of this invention is in connection with hollow-charge projectiles, wherein the retaining ring is utilized to fix the preferably conical metallic lining in place and also to compensate for relatively large axial tolerances, in a simple and yet reliable manner. The retaining ring is received in a groove provided in the tip of the projectile which is threadedly attached to the housing of the hollow explosive charge, the retaining ring being interposed between the lining and tip.

These and further objects, features and advantages of the present invention will become more obvious from the following description when taken in connection with the accompanying drawings which show, for purposes of illustration only, several embodiments in accordance with the present invention, and wherein FIG. 1 is a top view of a retaining ring in accordance with the present invention;

Figure 1:
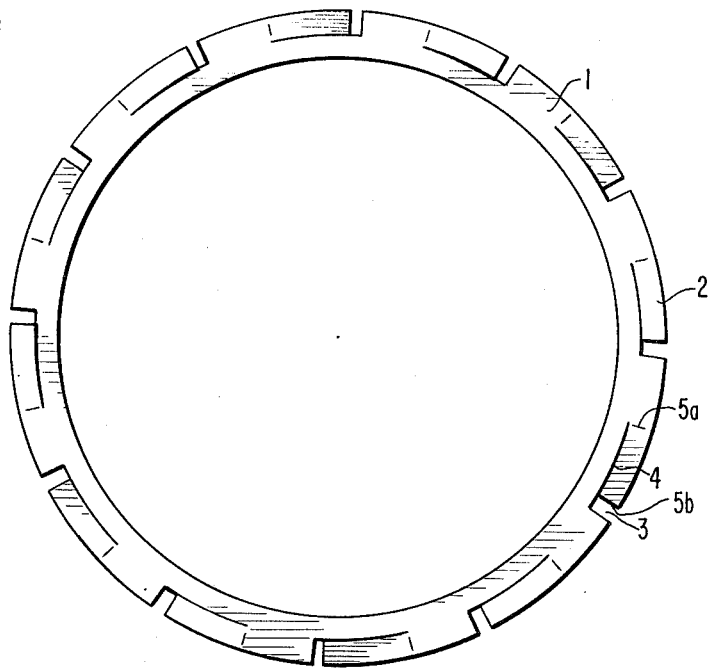

Referring now to the drawings, wherein like reference numerals are utilized to designate like parts throughout the several views, there is shown in FIG. 1 a retaining ring 1 having resilient tongues 2. The tongues 2 have been produced by a radial cutout 3 and a cut 4 extending in the peripheral direction, for example, by punching and are joined to the retaining ring 1 at the ends 5a and have a free end 5b. As shown, the ring is circular and the peripheral cut 4 lies on a circle concentric with the circle of the ring periphery. The tongues 2 extend in the peripheral direction of the ring and are uniformly distributed and are formed in the outer marginal zone of the retaining ring 1 so that this ring is especially suitable for insertion in a groove. In contrast thereto, if the retaining ring 1 is to be placed over a pin, a shaft, or the like, then the tongues 2 are advantageously arranged in the inner marginal zone of the retaining ring.

Figure 2:
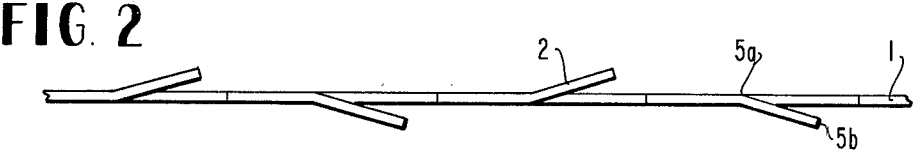
FIG. 2 is a partial side view of a planar projection of a retaining ring in accordance with an embodiment of the present invention for illustration purposes.

In the illustration of FIG. 2, the retaining ring 1 for illustration purposes is shown in a projection into the plane of the drawing, i.e., as an unwound ring. The ring is a flat annular member and the tongues 2 are bent at their ends 5a alternatingly toward the top and toward the bottom from the plane of the retaining ring 1 such that the alternate free ends 5b are positioned on different sides of the ring. In a modification of the illustrated configuration, the tongues 2 can also be bent-in themselves, in addition to the bending at the ends 5a. Imagining the tongues 2 to be bent back into the plane of the retaining ring 1, it can be seen that the radial cutouts 3 indicated in FIG. 1 are made to be relatively wide, such that the free ends 5b would not effect a closure of the ring. This has the purpose of ensuring that, when the retaining ring 1 is installed, the tongues 2 can readily be pressed back into the plane of the ring, if necessary, so that the retaining ring 1 is again completely planar.

Figure 3:
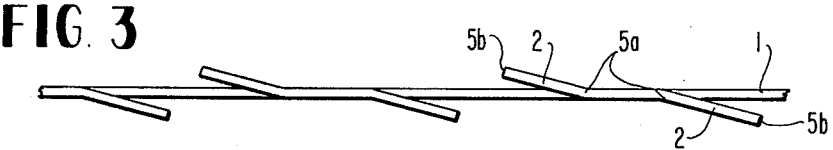
FIG. 3 is a partial side view of a planar projection of another embodiment of a retaining ring for illustration purposes.

FIG. 3 shows a retaining ring 1 provided for a screw-locking mechanism, wherein the tongues 2 are disposed so that tongues and the free ends 5b face each other in pairs and with the ends 5a being in pairs. Successive tongues 2 are thus bent toward different directions and avoid the loosening or untwisting of screws having a right-hand thread.

Figure 4:
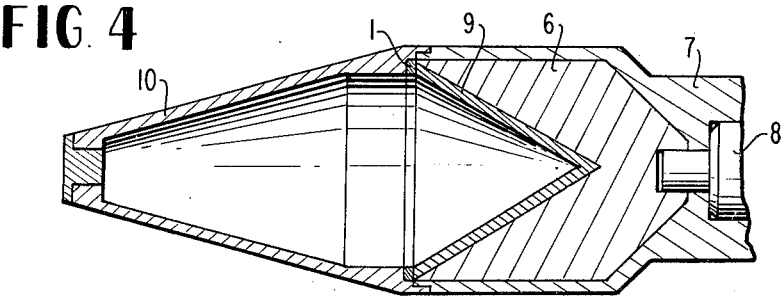
FIG. 4 is a longitudinal sectional view of the front end of a hollow-charge projectile utilizing a retaining ring in accordance with the present invention.

In FIG. 4 there is shown a sectional view of the front end of a hollow-charge projectile having a hollow explosive charge 6 arranged within a housing 7. A detonator 8 is provided at the rear end of the hollow explosive charge 6, and a conical metallic lining 9 is arranged at the front end. The projectile is provided with a tip portion 10 threadedly connected to the front end of the housing 7. By means of the interposed retaining ring 1, the tip 10 presses the metallic lining 9 firmly against the hollow explosive charge 6. In this connection, the retaining ring 1 also bridges larger fluctuations in the axial width of the receiving groove for the retaining ring 1 provided in the tip portion, so that the flawless contacting of the metallic lining and thus the satisfactory reaction of the hollow explosive charge are ensured.

Obviously, many modifications and variations of the present invention are possible in the light of the above teachings. It should therefore be understood that within the scope of the appended claims, the invention may be practiced otherwise than as specifically described.

We claim:

1. Apparatus comprising a hollow charge projectile including a projectile housing, a hollow explosive charge, and a metallic lining within the housing, a tip portion secured to the housing, a retaining ring including a ring-shaped member and resilient tongue members having one end thereof joined to the ring member, the tongue members being bent out of the plane of the ring member and extending at least approximately in the peripheral direction of the ring member, and the retaining ring being arranged for securing the position of the metallic lining within the housing, the retaining ring being disposed in a groove of the tip portion of the projectile.

2. Apparatus according to claim 1, wherein a plurality of tongue members are provided and successive tongue members are bent toward different sides of the ring member.

3. Apparatus according to claim 2, wherein the tongue members are integrally connected with the ring member, the tongue member being formed by a first radial cut extending partially through the radial extent of the ring member and by a second cut extending from the radial cut in the peripheral direction of the ring member, the formed tongue members being bent about a radial axis so as to be bent out of the plane of the ring member.

4. Apparatus according to claim 3, wherein the ring member is a circular flat member and the second cut forming the tongue members lies substantially on a circle concentric with the periphery of the ring member.

5. Apparatus according to claim 4, wherein the tongue members are uniformly distributed about the ring member and successive tongue members are bent toward different sides of the ring member.

6. Apparatus according to claim 1, wherein the ring member is continuous and closed upon itself.

7. Apparatus comprising a hollow charge projectile including a projectile housing, a hollow explosive charge, and a metallic lining within the housing, a tip portion secured to the housing, a retaining ring including a ring-shaped member and resilient tongue members having one end thereof joined to the ring member, the tongue members being bent out of the plane of the ring member and extending at least approximately in the peripheral direction of the ring member, and the retaining ring being arranged for securing the position of the metallic lining within the housing, the retaining ring being interposed between a part of the tip portion and the metallic lining for compensating for axial variations therebetween to firmly press the metallic lining against the hollow explosive charge, the retaining ring being disposed in a recess portion of the tip portion of the projectile.

* * * * *